No. 720,702. PATENTED FEB. 17, 1903.
J. W. KOHLHEPP.
MACHINE FOR SCRAPING OR DEHAIRING ANIMALS.
APPLICATION FILED DEC. 13, 1901.
NO MODEL.
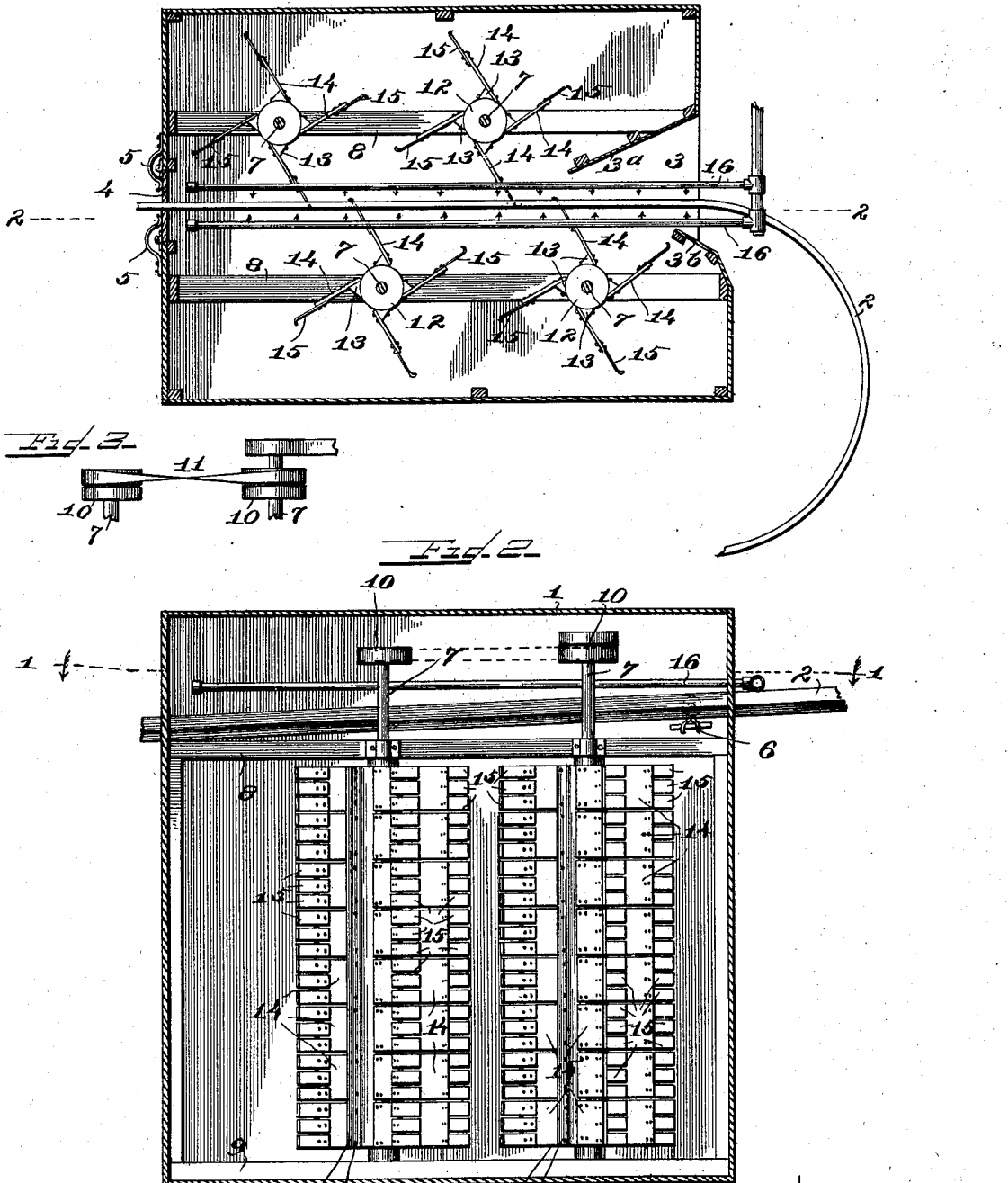

UNITED STATES PATENT OFFICE.

JOHN W. KOHLHEPP, OF CHICAGO, ILLINOIS.

MACHINE FOR SCRAPING OR DEHAIRING ANIMALS.

SPECIFICATION forming part of Letters Patent No. 720,702, dated February 17, 1903.

Application filed December 13, 1901. Serial No. 85,782. (No model.)

*To all whom it may concern:*

Be it known that I, JOHN W. KOHLHEPP, a citizen of the United States, residing at Chicago, in the county of Cook and State of Illinois, have invented certain new and useful Improvements in Machines for Scraping or Dehairing Animals, of which the following is a full, clear, and exact specification.

My invention relates more particularly to a machine for scraping or dehairing hogs; and it has for its primary object to provide improved and simple means whereby the hair may be scraped from the carcass while passing between suitable scrapers.

With these ends in view my invention consists in certain features of novelty in the construction, combination, and arrangement of parts by which the said objects and certain other objects hereinafter appearing are attained, all as fully described with reference to the accompanying drawings and more particularly pointed in the claims.

In the said drawings, Figure 1 is a plan section of my improved machine, taken on the line 1 1, Fig. 2. Fig. 2 is a vertical section thereof, taken on the line 2 2, Fig. 1. Fig. 3 is a detail side elevation of the pulley connections.

1 represents a suitable casing, through the upper part of which passes a track or runway 2, one side of the casing being provided with a vertical opening 3 and the other with a pair of outwardly-opening hinged doors 4, which, if desired, may be held normally closed by any suitable spring or device 5, the runway or track 2 passing through the opening 3 and between the said doors 4, and 6 is a gambrel-hook having a suitable trolley running on the track or way 2, which is preferably inclined, as shown in Fig. 2, so that the carcass may be suspended from the trolley 6 and allowed to run by gravity into the casing 1 through the opening 3 and pass out through the doors 4, which are automatically opened by the pressure of the carcass thereagainst.

Arranged on each side of the track or way 1 are one or more vertical shafts 7, journaled in suitable beams or bars 8 9 at the upper and lower ends, respectively, and provided at their upper ends with pulleys 10, connected together by suitable belting 11 in such a manner that all of the arms carried by the shafts 7 will be driven toward the doors 4 during their inner semirevolution. On each of these shafts 7 is secured a drum or hub 12, having angular vertical ribs or blocks 13, and to these vertical ribs or blocks are secured short flexible tangentially-arranged strips 14, composed of some suitable material, such as india-rubber, whose outer ends are provided with one or more scraping-blades 15, having their edges turned in the direction of rotation of the shaft. As shown in Fig. 2 of the drawings, there is a multiplicity of these strips 14, secured one over the other and in close proximity to each other, and each of them is in turn provided with a multiplicity of the scraping-blades 15, the number shown in the drawings being three. The purpose of the flexible strips 14 is to permit the blades 15 to yield sufficiently when they strike the carcass as the latter passes between the shafts 7 on the track 1, and thus avoid injuring the flesh, and the strips 14 being of slight vertical depth as compared with the depth of the entire series it follows that they will readily conform to the contour of the carcass, and hence enable the blades 15 to reach substantially every portion thereof. The scrapers thus described are preferably inclosed in the casing 1, as before explained, in order to confine the dirt and falling particles; but the principal reason for thus inclosing them is to provide for the employment of one or more spray-pipes 16, arranged at the upper part of the casing and having suitable spray-apertures on their under sides directed against the carcass as it passes through the casing for the purpose of washing off the loosened hair and other particles. The inlet 3 of the casing may be provided with narrow and wide shields $3^a$ $3^b$, which guard in a large measure against the water splashing out.

Having thus described my invention, what I claim as new therein, and desire to secure by Letters Patent, is—

1. A machine of the character described comprising a casing, a runway or track passing through the casing, spray-pipes located on opposite sides of the runway or track, vertical shafts located on opposite sides of the runway or track, drums having vertical ribs and secured on the shafts, flexible strips provided with scraping-blades secured to the vertical ribs and means for rotating the shafts.

2. A machine of the character described comprising a casing provided with a vertical opening at its inner end, narrow and wide shields located at opposite sides of the opening, a runway or track passing through the casing, spray-pipes located on opposite sides of the runway or track, vertical shafts located on opposite sides of the runway or track, drums provided with scraping-blades secured to the shafts, and means for rotating the shafts.

3. A machine of the character described comprising a casing, spring-doors at the outer end of the casing, a runway or track passing through the casing, spray-pipes located on opposite sides of the runway or track, vertical shafts located on opposite sides of the runway or track, drums provided with scraping-blades secured to the shafts and means for rotating the shafts.

4. A machine of the character described comprising a casing provided with a vertical opening at its inner end narrow and wide shields located at opposite sides of the opening, spring-doors located at the outer end of the casing, a runway or track passing through the casing, vertical shafts located on opposite sides of the runway or track, drums provided with scraping-blades secured to the shafts, and means for rotating the shafts.

JOHN W. KOHLHEPP.

Witnesses:
F. A. HOPKINS,
W. D. CROSS.